(12) United States Patent
Sawa et al.

(10) Patent No.: US 9,544,315 B2
(45) Date of Patent: Jan. 10, 2017

(54) ACCESS-LEVEL CONTROL APPARATUS

(71) Applicant: Mitsubishi Electric Corporation, Tokyo (JP)

(72) Inventors: Yoshitsugu Sawa, Tokyo (JP); Junji Kondo, Tokyo (JP); Kenji Inomata, Tokyo (JP); Nobuyuki Takahashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/032,673

(22) PCT Filed: Nov. 11, 2013

(86) PCT No.: PCT/JP2013/080435
§ 371 (c)(1),
(2) Date: Apr. 28, 2016

(87) PCT Pub. No.: WO2015/068303
PCT Pub. Date: May 14, 2015

(65) Prior Publication Data
US 2016/0285883 A1    Sep. 29, 2016

(51) Int. Cl.
*G06F 21/35* (2013.01)
*H04L 29/06* (2006.01)
(Continued)

(52) U.S. Cl.
CPC ......... *H04L 63/102* (2013.01); *G06K 7/10366* (2013.01); *G06F 21/35* (2013.01); *G06K 19/07773* (2013.01)

(58) Field of Classification Search
CPC ... H04L 63/102; G06F 21/35; G06K 19/07773
See application file for complete search history.

(56) References Cited

U.S. PATENT DOCUMENTS 6,307,471 B1 * 10/2001 Xydis ................ G07C 9/00111
340/539.1
2007/0164911 A1 * 7/2007 Locke .................... H01Q 3/02
343/702
(Continued)

FOREIGN PATENT DOCUMENTS

JP           4-184506 A      7/1992
JP        2006-195621 A      7/2006
(Continued)

OTHER PUBLICATIONS

International Search Report for PCT/JP2013/080435 dated Jan. 21, 2014.

*Primary Examiner* — David Pearson
(74) *Attorney, Agent, or Firm* — Sughrue Mion, PLLC; Richard C. Turner

(57) ABSTRACT

An access-level control apparatus includes an NC machine tool, an RFID that is held by an operator and stores an ID given to the operator, a reader unit that reads out the ID in the RFID, an authenticating unit that determines operator processing limitation information including an operable range by the operator associated with the ID or display information provided to the operator, and an operation/display limiting unit that limits processing by the operator for the NC machine tool on the basis of the operator processing limitation information. The reader unit includes a transmission antenna that calls the RFID. The transmission antenna is disposed in parallel to a rotation axis of a motor unit of the NC machine tool.

18 Claims, 12 Drawing Sheets

(51) Int. Cl.
*G06K 7/10* (2006.01)
*G06K 19/077* (2006.01)

(56) References Cited

U.S. PATENT DOCUMENTS

| | | | | |
|---|---|---|---|---|
| 2009/0164039 A1* | 6/2009 | Jung | ............... | G05B 19/0426 |
| | | | | 700/117 |
| 2013/0072115 A1* | 3/2013 | Dobyns | ............... | H04B 5/0081 |
| | | | | 455/41.1 |
| 2015/0015372 A1* | 1/2015 | Hara | ............... | H01Q 1/2216 |
| | | | | 340/10.1 |

FOREIGN PATENT DOCUMENTS

| | | |
|---|---|---|
| JP | 2007-318437 A | 12/2007 |
| JP | 2008-221363 A | 9/2008 |
| JP | 2008-250479 A | 10/2008 |
| JP | 2009-155108 A | 7/2009 |
| JP | 2010-198465 A | 9/2010 |

* cited by examiner

ACCESS-LEVEL CONTROL APPARATUS

CROSS REFERENCE TO RELATED APPLICATIONS

This application is a National Stage of International Application No. PCT/JP2013/080435 filed Nov. 11, 2013, the contents of which are incorporated herein by reference in their entirety.

FIELD

The present invention relates to an access-level control apparatus.

BACKGROUND

In a numerical control (NC) machine tool, it has been a general practice that a plurality of operators such as an operator who inputs a control program of an NC apparatus and causes the NC apparatus to execute work and an operator who monitors a state during the work and checks that the NC apparatus is normally operating operate the NC machine tool and monitor a state of the NC machine tool. In this case, it is necessary to prevent wrong operation by an inexperienced operator or a leak of information such as a control program or a control parameter by a malicious operator. Technologies for preventing the wrong operation and the leak have been proposed.

For example, there has been proposed an apparatus that, when the NC machine tool is broken, checks, using an RFID (Radio Frequency Identification), whether an operator is an operator having a recovery operation ability and prevents recovery work from a failure by an inexperienced operator (see, for example, Patent Literature 1). There has been proposed a plant control system in which a user carries a transmission device that transmits a user ID and the system limits an operation range on the basis of the user ID read by a user-ID reading device and records an operation history of each user (see, for example, Patent Literature 2).

CITATION LIST

Patent Literature

Patent Literature 1: Japanese Patent Application Laid-Open No. 2008-250479
Patent Literature 2: Japanese Patent Application Laid-Open No. 2006-195621

SUMMARY

Technical Problem

However, in the method of authenticating an operator using the RFID in the NC machine tool, when the NC machine tool is operating, there is a problem in that stable authentication cannot be performed by the RFID because of the influence of noise radiated from the NC machine tool.

The present invention has been devised in view of the above and it is an object of the present invention to obtain an access-level control apparatus that can stably authenticate an operator using an RFID even while an NC machine tool is operating.

Solution to Problem

In order to achieve the object, there is provided an access-level control apparatus including: an NC machine tool; an RFID held by an operator, the RFID storing an ID given to the operator; a reader unit that reads out the ID in the RFID; an authenticating unit that determines operator processing limitation information including an operable range by the operator associated with the ID or display information provided to the operator; an operation/display limiting unit that limits processing by the operator for the NC machine tool on the basis of the operator processing limitation information; and an operation detecting unit that detects operation of the NC machine tool by the operator, wherein the reader unit includes a transmission antenna that calls the RFID, and the transmission antenna is disposed in parallel to a rotation axis of a motor unit of the NC machine tool disposed in a position closest to the operation detecting unit.

Advantageous Effects of Invention

According to the present invention, the rotation axis of the motor unit of the NC machine tool and the transmission antenna of the reader unit are disposed in parallel. Therefore, a call signal radiated from the transmission antenna of the reader unit can be increased in a direction in which noise radiated from the motor unit during operation is less. As a result, there is an effect that it is possible to stably authenticate the RFID even while the NC machine tool is operating.

DESCRIPTION OF EMBODIMENTS

Access-level control apparatuses according to embodiments of the present invention are explained in detail below with reference to the accompanying drawings. Note that the present invention is not limited by the embodiments.

First Embodiment

Figure 1:
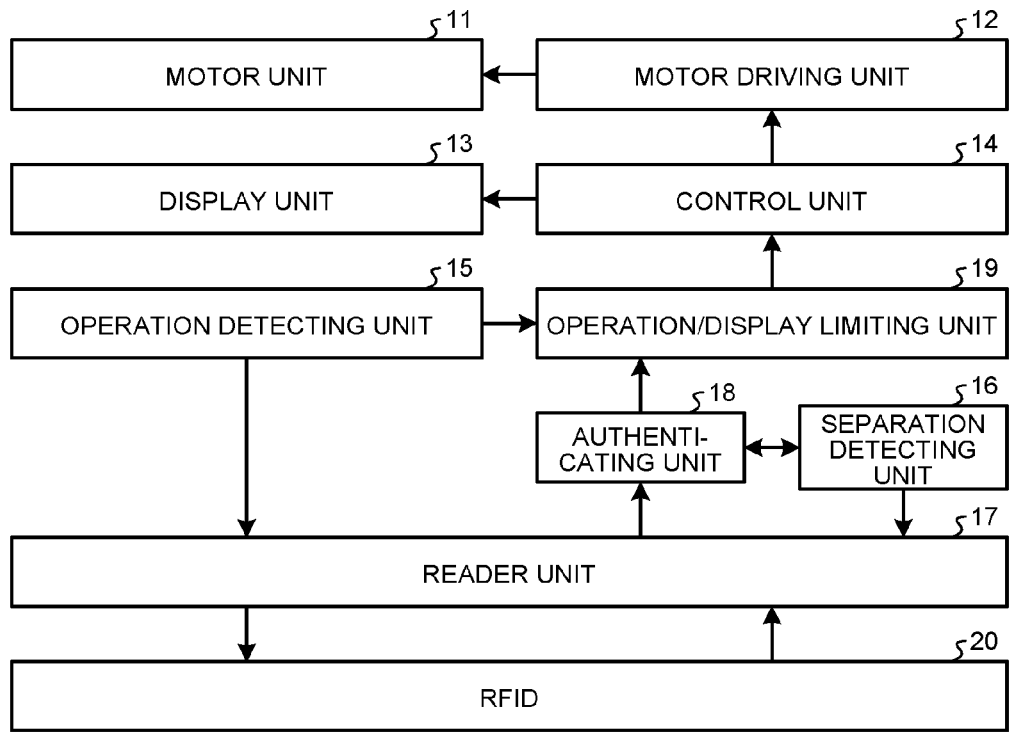
FIG. 1 is a block diagram schematically showing the configuration of an access-level control apparatus according to a first embodiment.

FIG. 1 is a block diagram schematically showing the configuration of an access-level control apparatus according to a first embodiment. The access-level control apparatus is an apparatus obtained by adding, to an NC machining apparatus, a function of reading an ID in an RFID held by an operator and performing limitation of an access to the NC machining apparatus for each operator.

The access-level control apparatus includes a motor unit 11, a motor driving unit 12, a display unit 13, a control unit 14, an operation/display limiting unit 19, an operation detecting unit 15, a separation detecting unit 16, an authenticating unit 18 that determines an operation range, information to be displayed, or the like on the basis of an acquired ID, a reader unit 17 that acquires an ID from an RFID held by an operator, and an RFID 20.

The motor unit 11, the motor driving unit 12, the display unit 13, and the control unit 14 have configurations same as those of a general NC machining apparatus. The motor unit 11 causes a target object or a tool to perform a predetermined motion. The motor driving unit 12 drives the motor unit 11. The display unit 13 displays a work state to the operator and displays a program and the like. The control unit 14 controls the motor driving unit 12 and the display unit 13.

The operation detecting unit 15 detects operation of the access-level control apparatus (the NC machining apparatus) by the operator. When detecting the operation by the operator, the operation detecting unit 15 instructs the reader unit 17 to acquire an ID from the RFID 20 held by the operator.

The separation detecting unit 16 detects whether work by an operator, for whom operation or display is limited by the operation/display limiting unit 19, ends. When detecting the end of the operation by the operator, the separation detecting unit 16 notifies the authenticating unit 18 that the operator separates from the NC machine tool.

Figure 2:
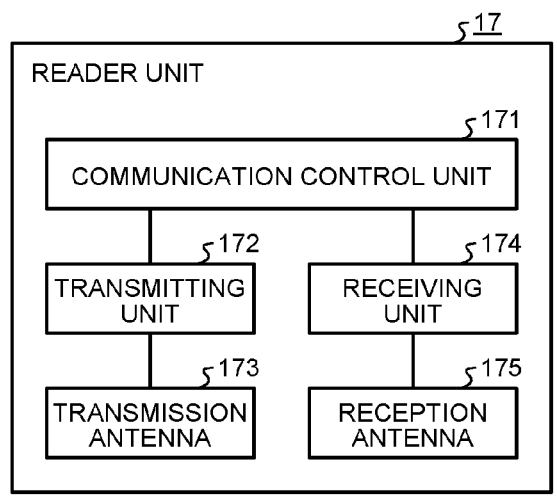
FIG. 2 is a block diagram schematically showing the configuration of a reader unit according to the first embodiment.

The reader unit 17 transmits a call signal to the RFID 20 held by the operator, acquires an ID from a response from the RFID 20, and passes the ID to the authenticating unit 18. FIG. 2 is a block diagram schematically showing the configuration of the reader unit according to the first embodiment. The reader unit 17 includes a communication control unit 171, a transmitting unit 172, a transmission antenna 173, a receiving unit 174, and a reception antenna 175.

The communication control unit 171 performs control to transmit a call signal on the basis of an instruction from the operation detecting unit 15 or the separation detecting unit 16, extracts an ID from a signal received from the RFID 20, and notifies the authenticating unit 18 of the ID.

The transmitting unit 172 modulates, according to an instruction from the communication control unit 171, for example, a call signal including a start pattern of a tag (the RFID 20) at a certain frequency, for example, an LF (Low Frequency) band (approximately 130 kHz), and transmits the call signal. The transmission antenna 173 is configured by, for example, a loop sufficiently small with respect to a wavelength and radiates a near magnetic field. Note that the near magnetic field is a magnetic field that propagates in a region extremely close to the transmission antenna 173, which is a generation source of an electromagnetic wave, and is a magnetic field, a distance characteristic of magnetic field intensity of which decreases at $1/r^3$ or $1/r^2$.

The receiving unit 174 demodulates a received modulated signal in, for example, a UHF (Ultra High Frequency) band (approximately 315 MHz) received from the tag. The reception antenna 175 receives a signal from the tag.

Note that the example explained above is only an example. The present invention is not limited to this. For example, as the transmission antenna 173, an air-core loop antenna, a loop antenna including ferrite as a core, or the like can be used.

The authenticating unit 18 determines an operation range, information to be displayed, or the like on the basis of the acquired ID. The authenticating unit 18 retains, for example, authentication information in which operation ranges, displayable information, or the like are associated with IDs. The authenticating unit 18 extracts, from the authentication information, an operation range or displayable information (hereinafter referred to as operator processing limitation information) corresponding to the ID acquired from the reader unit 17 and passes the operation range or the displayable information to the operation/display limiting unit 19. When receiving a signal indicating the separation of the operator from the separation detecting unit 16, the authenticating unit 18 notifies the operation/display limiting unit 19 that the operator processing limitation information set for the operator is released.

The operation/display limiting unit 19 performs, in response to the operation by the operator from the operation detecting unit 15, limitation on the basis of the operator processing limitation information corresponding to the ID acquired from the authenticating unit 18. For example, when processing content input to the operation detecting unit 15 from the operator exceeds the operator processing limitation information, the operation/display limiting unit 19 does not gives an instruction to the control unit 14 concerning processing in a range in which the processing content exceeds the operator processing limitation information. When receiving the notification for the release of the authentication from the authenticating unit 18, the operation/display limiting unit 19 releases the operator processing limitation information set for the operator.

Figure 3:
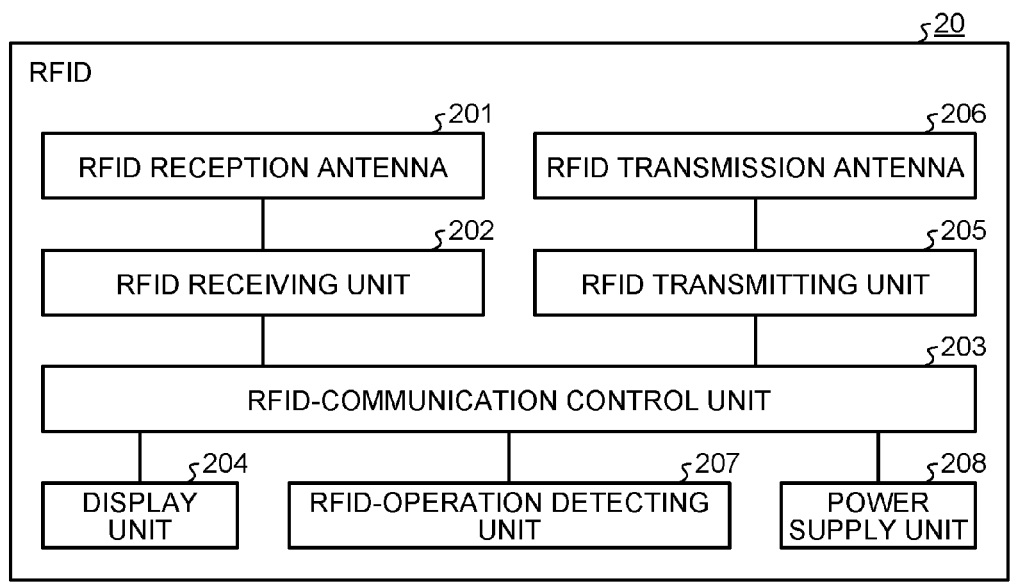
FIG. 3 is a block diagram schematically showing the configuration of an RFID according to the first embodiment.

The RFID 20 is a tag held by the operator of the access-level control apparatus. FIG. 3 is a block diagram schematically showing the configuration of the RFID according to the first embodiment. The RFID 20 includes an RFID reception antenna 201, an RFID receiving unit 202, an RFID-communication control unit 203, a display unit 204, an RFID-transmission antenna 206, an RFID transmitting unit 205, an RFID-operation detecting unit 207, and a power supply unit 208.

The RFID-reception antenna 201 receives the call signal transmitted by the reader unit 17. The RFID receiving unit 202 demodulates the received signal (call signal). The RFID receiving unit 202 generates a start signal for staring the RFID-communication control unit 203 when the call signal is a call including a normal start pattern from the reader unit 17 and outputs a demodulated signal.

The RFID-communication control unit 203 is started on the basis of the start signal or a start signal from the RFID-operation detecting unit 207. When started from the RFID receiving unit 202, the RFID-communication control unit 203 determines presence or absence of a response on the basis of the demodulated signal received from the RFID receiving unit 202. When determining to respond in the response presence or absence determination or when started by the start signal from the RFID-operation detecting unit 207, the RFID-communication control unit 203 starts the RFID transmitting unit 205 and transmits a response signal to the RFID 20. Note that the response signal includes an ID concerning the operator holding the RFID 20.

The display unit 204 displays, to the operator, according to an instruction of the RFID-communication control unit 203, a state such as reception completion or under transmission using, for example, an LED (Light Emitting Diode).

The RFID transmitting unit 205 is started by the RFID-communication control unit 203 and modulates a signal output by the RFID-communication control unit 203 into, for example, a UHF band (approximately 315 MHz). The RFID transmission antenna 206 transmits the signal modulated by the RFID transmitting unit 205.

The RFID-operation detecting unit 207 detects that the operator has operated a switch or the like of the RFID 20. The power supply unit 208 is a power supply of the RFID 20. For example, a battery can be used as the power supply unit 208.

Note that the RFID reception antenna 201 can be configured by, for example, a micro loop antenna and receives a call signal in an LF band (approximately 130 kHz). The RFID receiving unit 202 can be configured to operate with electric power induced by the loop antenna and not to use electric power of the power supply unit 208 as much as possible. Consequently, it is possible to reduce time in which the power supply unit 208 operates in the RFID. It is possible to extend the life of the power supply unit 208. However, this is only an example. The present invention is not limited to this.

Figure 4:
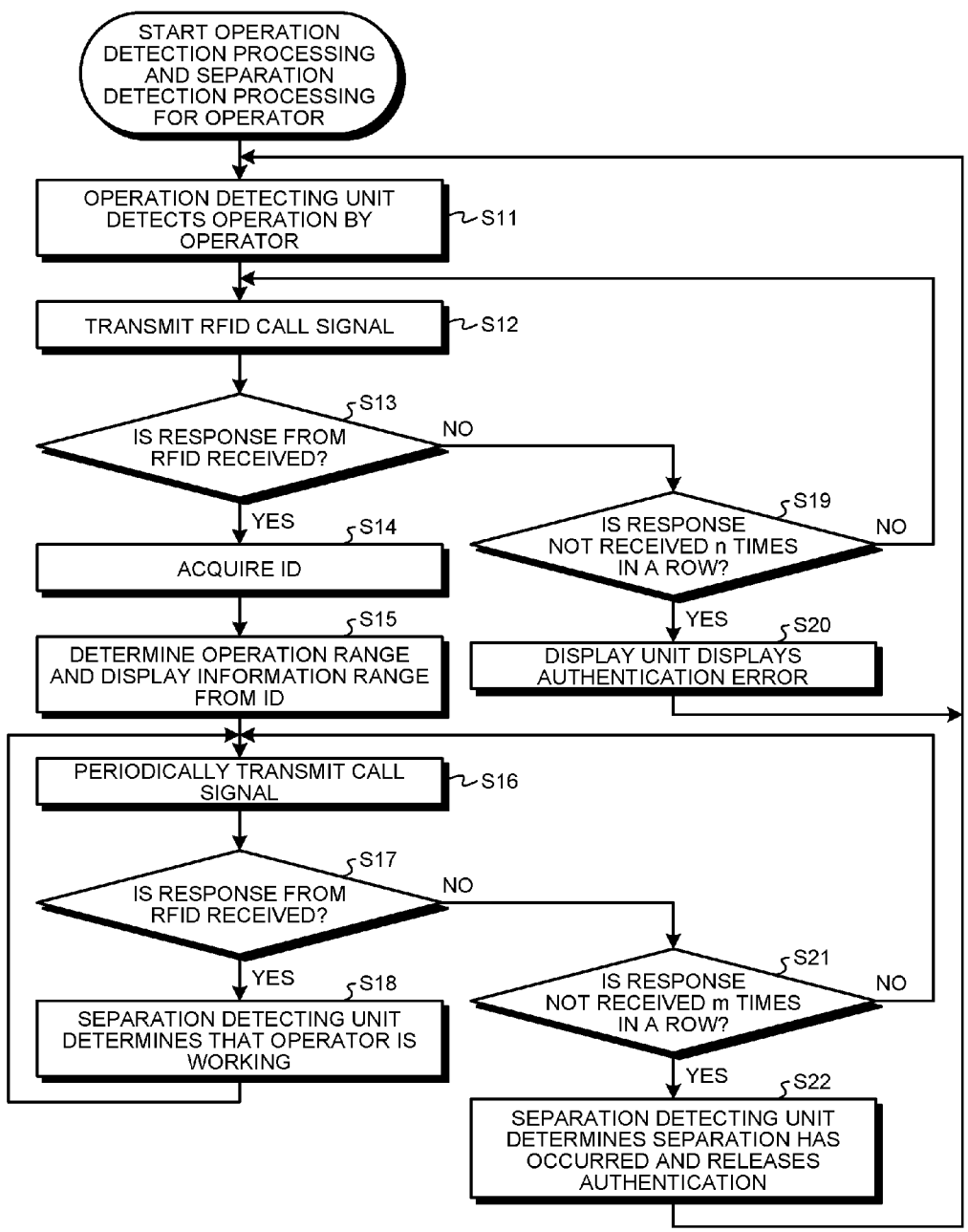
FIG. 4 is a flowchart for explaining an example of a procedure of operation detection processing and separation detection processing for an operator according to the first embodiment.

FIG. 4 is a flowchart for explaining an example of a procedure of operation detection processing and separation detection processing for the operator according to the first embodiment. First, the operation detecting unit 15 detects operation performed by the operator to work (step S11). When the operation by the operator is detected by the operation detecting unit 15, the reader unit 17 transmits a call signal for reading out an ID of the RFID 20 held by the operator (step S12). The communication control unit 171 in the reader unit 17 instructs the transmitting unit 172 to transmit a call signal. The transmitting unit 172 modulates a call signal including a start pattern of the RFID 20 and transmits the call signal via the transmission antenna.

Thereafter, the reader unit 17 checks whether an ID response from the RFID 20 is received (step S13). When the response is received (Yes at step S13), that is, when a received modulated signal is received from the RFID 20 via the reception antenna 175, the receiving unit 174 demodulates the received modulated signal and passes the demodulated signal to the communication control unit 171. The communication control unit 171 acquires an ID from the signal (step S14) and notifies the authenticating unit 18 of the acquired ID.

The authenticating unit 18 determines an operation range or a display information range from the acquired ID (step S15). Specifically, the authenticating unit 18 acquires operator processing limitation information corresponding to the acquired ID from authentication information to thereby determine the operation range or the display information range. The authenticating unit 18 passes the acquired operator processing limitation information to the operation/display limiting unit 19.

Thereafter, the operation/display limiting unit 19 limits an instruction from an operator detected by the operation detecting unit 15 to be processed within a range of the operator processing limitation information. For example, when the instruction from the operator detected by the operation detecting unit 15 is an instruction within the range of the operator processing limitation information, the operation/display limiting unit 19 directly passes the instruction to the control unit 14. However, when the instruction is outside the range of the operator processing limitation information, the operation/display limiting unit 19 limits the instruction within the range of the operator processing limitation information and passes the instruction to the control unit 14.

On the other hand, when the response from the RFID 20 is not received at step S13 (No at step S13), the reader unit 17 determines whether the response is not received a predetermined number of times (n times: n is a natural number) in a row (step S19). When the response is not received the number of times smaller than the predetermined number of times (No at step S19), the processing returns to step S12. When the response is not received the predetermined number of times in a row (Yes at step S19), the control unit 14 displays information indicating an authentication error on the display unit 13 (step S20). The processing returns to step S11.

After step S15, processing for the operation by the operator is performed. The reader unit 17 periodically transmits a call signal to the RFID 20 (step S16) and determines whether a response from the RFID 20 is received (step S17). This is for determining whether the operator who determines the operation range and the display information range at step S15 is continuing the work.

As a result of the determination, when the response from the RFID 20 is received (Yes at step S17), the separation detecting unit 16 determines that the operator detected by the operation detecting unit 15 at step S11 is still working (step S18). The processing returns to step S16.

When the response from the RFID 20 is not received (No at step S17), the reader unit 17 determines whether the response is not received a predetermined number of times (m times: m is a natural number) in a row (step S21). When the response is not received the number of times smaller than the predetermined number of times (No at step S21), the processing returns to step S16. When the response is not received the predetermined number of times in a row (Yes at step S21), the separation detecting unit 16 determines that the operator detected at step S11 separates from the NC machine tool, and releases the authentication (step S22). The processing returns to S11.

Note that the number of times it is determined at step S19 or step S21 that the response is not received in a row can be any number of times as long as the number of times is once or more times and does not depends on the number of times. The operator can set the number of times.

Figure 5:
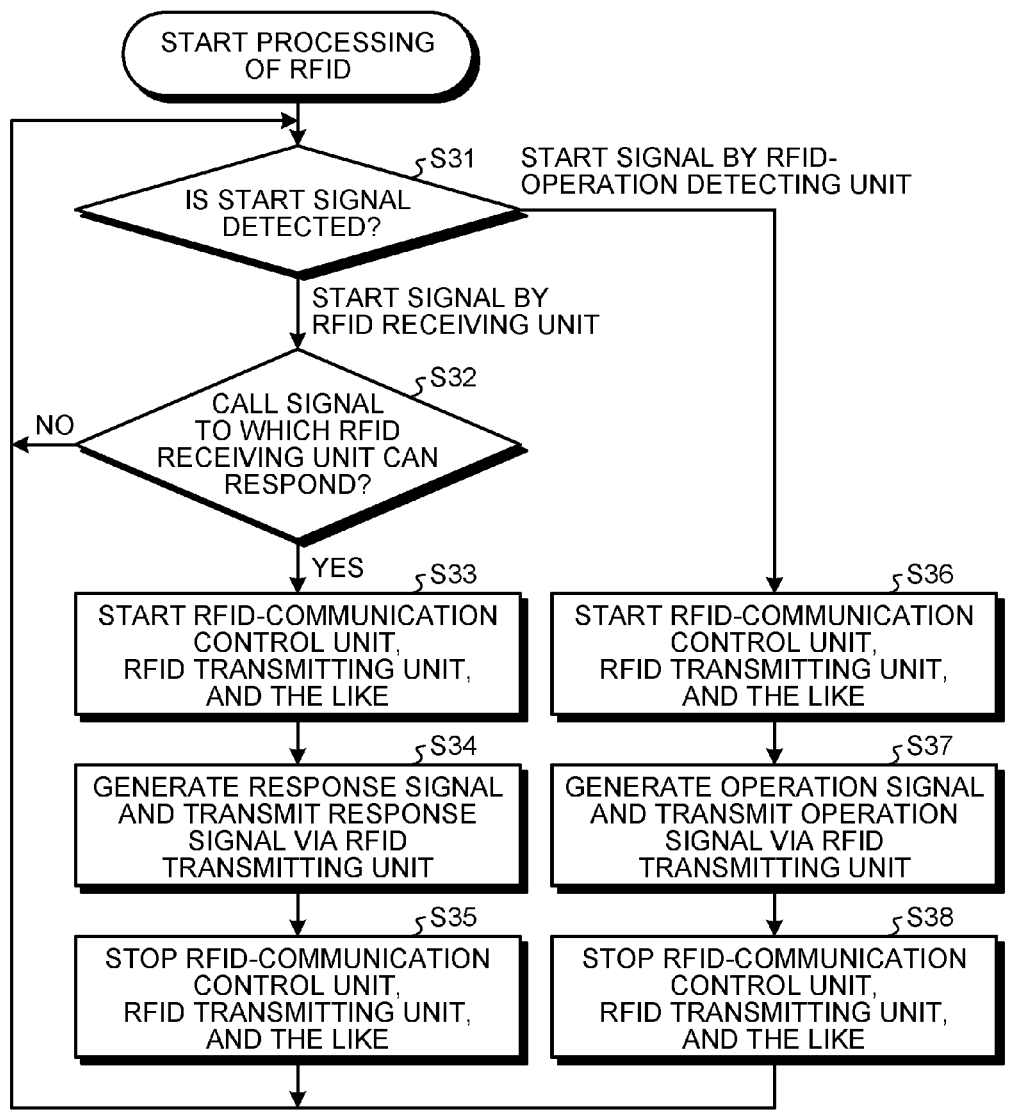
FIG. 5 is a flowchart for explaining an example of processing of the RFID according to the first embodiment.

Processing in the RFID 20 is explained. FIG. 5 is a flowchart for explaining an example of processing of the RFID according to the first embodiment. First, the RFID 20 is in a reception waiting state for a start signal for determining whether the start signal is detected (step S31). At this point, the RFID-communication control unit 203 and the RFID transmitting unit 205 are in a sleep state. Only the RFID receiving unit 202 and the RFID-operation detecting unit 207 are in a started state.

When a call signal transmitted by the reader unit 17 is received by the RFID reception antenna 201 at step S31 (in the case of a start signal by the RFID receiving unit at step S31), the RFID receiving unit 202 demodulates the received call signal and determines whether the call signal is a call signal to which the RFID receiving unit 202 can respond (step S32). As a method of determining whether the call signal is the call signal to which the RFID receiving unit 202 can respond, for example, there is a method of including a specific pattern in the head of the call signal. As the determination concerning whether the call signal is the call signal to which the RFID receiving unit 202 can respond, the RFID receiving unit 202 can determine according to reception intensity other than the specific pattern whether the call signal is the call signal to which the RFID receiving unit 202 can respond. Alternatively, the RFID receiving unit 202 can detect a frequency.

When determining that the call signal is the call signal to which the RFID receiving unit 202 can respond (Yes at step S32), the RFID receiving unit 202 generates a start signal for starting the RFID-communication control unit 203 and the RFID transmitting unit 205 and starts the RFID-communication control unit 203, the RFID transmitting unit 205, and the like (step S33).

The RFID-communication control unit 203 generates a response signal including an ID for the call signal. The RFID transmitting unit 205 returns the response signal to the reader unit 17 (step S34). Thereafter, the RFID receiving unit 202 returns the RFID-communication control unit 203 and the RFID transmitting unit 205 to the sleep (stop) state (step S35). The processing returns to step S31. When it is determined at step S32 that the response signal is a call signal to which the RFID receiving unit 202 cannot respond (No at step S32), the processing returns to step S31.

When the operation by the operator is detected by the RFID-operation detecting unit 207 at step S31 (in the case of the start signal by the RFID-operation detecting unit at step S31), the RFID-operation detecting unit 207 starts the RFID-communication control unit 203, the RFID transmitting unit 205, and the like (step S36). The RFID-communication control unit 203 generates a button operation signal and transmits the button operation signal via the RFID transmitting unit 205 and the RFID transmission antenna 206 (step S37). Thereafter, the RFID-operation detecting unit 207 returns the RFID-communication control unit 203 and the RFID transmitting unit 205 to the sleep state (step S38). The processing returns to step S31. Note that, as the button operation signal operated at step S37, a flag indicating that button operation is performed can be included in transmission data to distinguish the button operation signal from the response signal.

Figure 6:
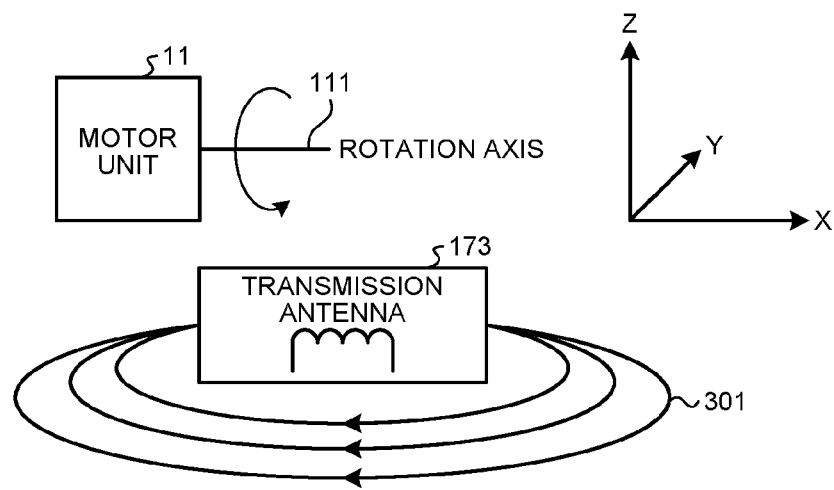
FIG. 6 is a diagram schematically showing a positional relation between a transmission antenna and a motor unit of the access-level control apparatus according to the first embodiment.

FIG. 6 is a diagram schematically showing a positional relation between the transmission antenna and the motor unit of the access-level control apparatus according to the first embodiment. A rotation axis 111 of the motor unit 11 is represented as an X axis. A Y axis and a Z axis perpendicular to each other are disposed in a plane perpendicular to the X axis. As shown in FIG. 6, if the motor unit 11 can rotate about the rotation axis 111 (the X axis), the transmission antenna 173 is disposed in parallel to the rotation axis 111. Note that, when a one-axis micro loop antenna is used as the transmission antenna 173, disposing the transmission antenna 173 parallel to the rotation axis 111 means looping the transmission antenna 173 in a direction same as a rotating direction of the motor unit 11 (setting an opening surface in the X-axis direction). When a one-axis ferrite loop antenna is used, disposing the transmission antenna 173 parallel to the rotation axis means disposing the longitudinal direction of ferrite in a direction same as the rotation axis 111 (disposing the longitudinal direction in the X-axis direction). As a radiated magnetic field transmitted when the transmission antenna 173 is disposed in this way, an intense signal is transmitted in a direction indicated by a sign 301. Note that a range in which a signal from the RFID 20 can be stably authenticated without being affected by noise radiated from the NC machine tool is a range in which the center direction of the opening surface is equal to or smaller than approximately ±15 degrees with respect to the rotation axis 11. In this specification, parallel means the range in which the center direction of the opening surface is equal to or smaller than approximately ±15 degrees with respect to the rotation axis 111. Disposition accuracy between the transmission antenna 173 and the rotation axis 111 can be calculated by an experiment or the like.

It is assumed that a plurality of motor units 11 are present in the NC machining apparatus. Therefore, the transmission antenna 173 can be disposed to be parallel to the rotation axis 111 of the motor unit 11 present closest to an area where the RFID 20 is desired to be authenticated. The transmission antenna 173 can be disposed to be parallel to the rotation axis 111 of the motor unit 11 having the largest capacity. By measuring noise in an authentication area, the transmission antenna 173 can be disposed in parallel to the rotation axis 111 of the motor unit 11 having the largest noise in the authentication area.

Figure 7:
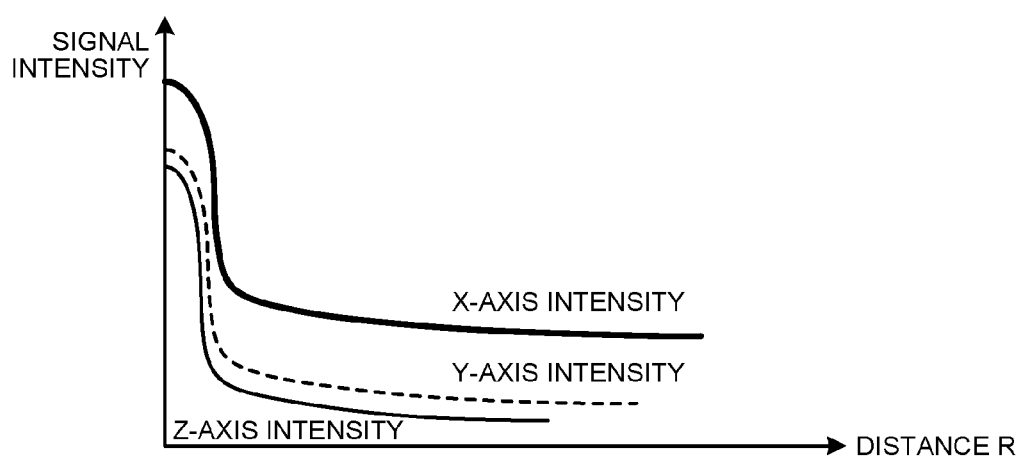
FIG. 7 is a diagram showing signal intensity corresponding to distances in axes at the time when the transmission antenna and the motor unit are disposed as shown in FIG. 6.

FIG. 7 is a diagram showing signal intensity corresponding to distances in the axes at the time when the transmission antenna and the motor unit are disposed as shown in FIG. 6. In this figure, the abscissa indicates the distance between the transmission antenna 173 and the motor unit 11 and the ordinate indicates the signal intensity. When the transmission antenna 173 and the motor unit 11 are disposed as shown in FIG. 6, signal intensity in the X-axis direction, which is the rotation axis direction of the motor unit 11, increases in proportion to signal intensity in the Y-axis direction and the Z-axis direction.

As explained above, according to the first embodiment, the transmission antenna 173 is disposed in parallel to the rotation axis direction of the motor unit 11. Therefore, it is possible to increase a transmission call signal of the reader unit 17 in a direction in which noise emitted from the motor unit 11 while the NC machine tool is operating is less. As a result, it is possible to obtain an effect that it is possible to stably perform authentication with the RFID 20 by radio even while the motor unit 11 and the like are operating.

The transmission antenna 173 is disposed in parallel to the rotation axis of the motor unit 11 disposed in the position closest to the operation detecting unit 15. Therefore, there is an effect that it is possible to reduce the influence of noise radiated from the motor unit 11 closest to an area where the operator works and it is possible to stably authenticate the RFID 20 even while the NC machine tool is operating.

Further, the transmission antenna 173 is disposed in parallel to the rotation axis of the motor unit 11 having the largest capacity. Therefore, there is an effect that it is possible to reduce the influence of noise radiated from the largest motor unit 11 in the area where the operator works and it is possible to stably authenticate the RFID 20 even while the NC machine tool is operating.

The transmission antenna 173 uses the near magnetic field by the micro loop antenna as a transmission signal. Therefore, it is possible to limit the direction of the near magnetic field that forms the authentication area.

Further, the RFID 20 is authenticated first by the authenticating unit 18 and, even after the operation range or the displayable information is determined by the operation/display limiting unit 19, it is periodically checked by the reader unit 17 whether the RFID 20 is present in the authentication area, when the authentication cannot by performed the predetermined number of times in a row, it is determined by the separation detecting unit 16 that the RFID 20 separates from the NC machine tool, the authentication is released, the permitted operation is released by the operation/display limiting unit 19, and the display information is erased. Consequently, the access-level control apparatus can quickly detect that the operator separates from the NC machine tool and release the authentication without the operator performing any special operation.

Second Embodiment

In the first embodiment, the transmission antenna is provided in one motor unit. In the following explanation in a second embodiment, transmission antennas are provided in a plurality of motor units.

Figure 8:
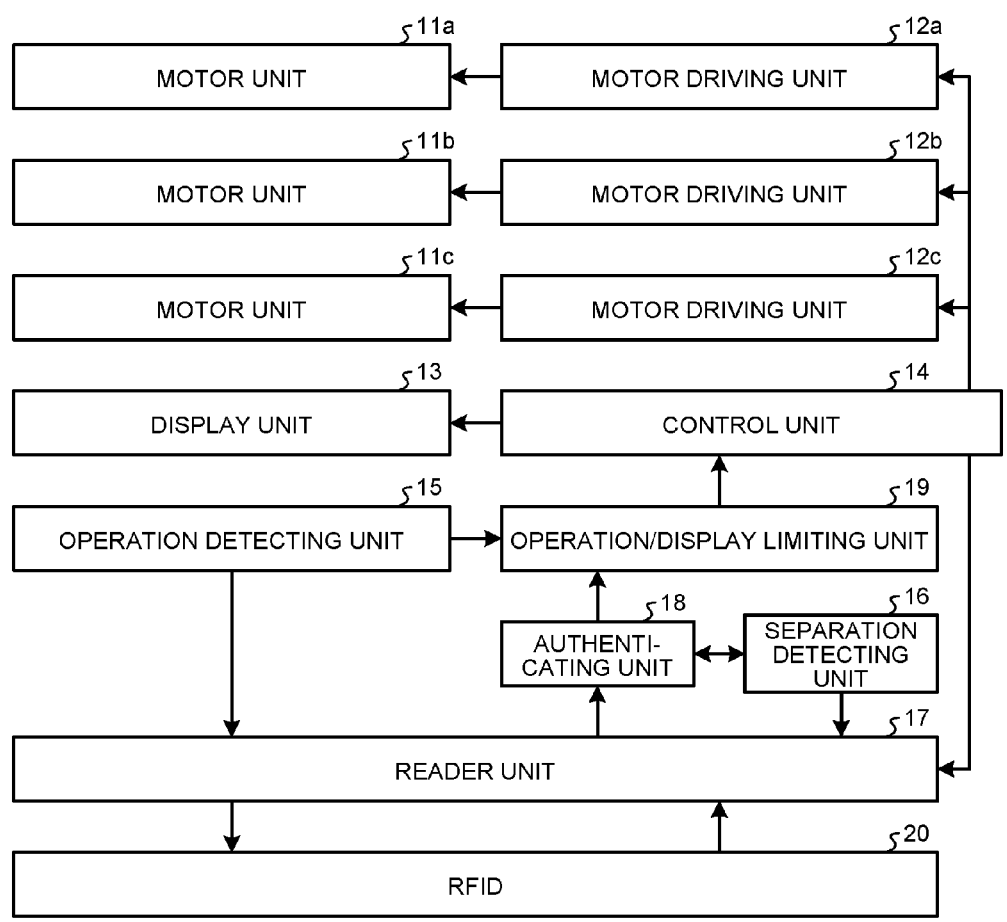
FIG. 8 is a block diagram schematically showing the configuration of an access-level control apparatus according to a second embodiment.

FIG. 8 is a block diagram schematically showing the configuration of an access-level control apparatus according to the second embodiment. The access-level control apparatus has a configuration in which, in the access-level control apparatus in the first embodiment, a plurality of (in an example shown in the figure, three) motor units 11a to 11c and a plurality of motor driving units 12a to 12c are provided and a function of notifying the reader unit 17 of control states such as the number of revolutions of the motor driving units 12a to 12c is further provided in the control unit 14.

Figure 9:
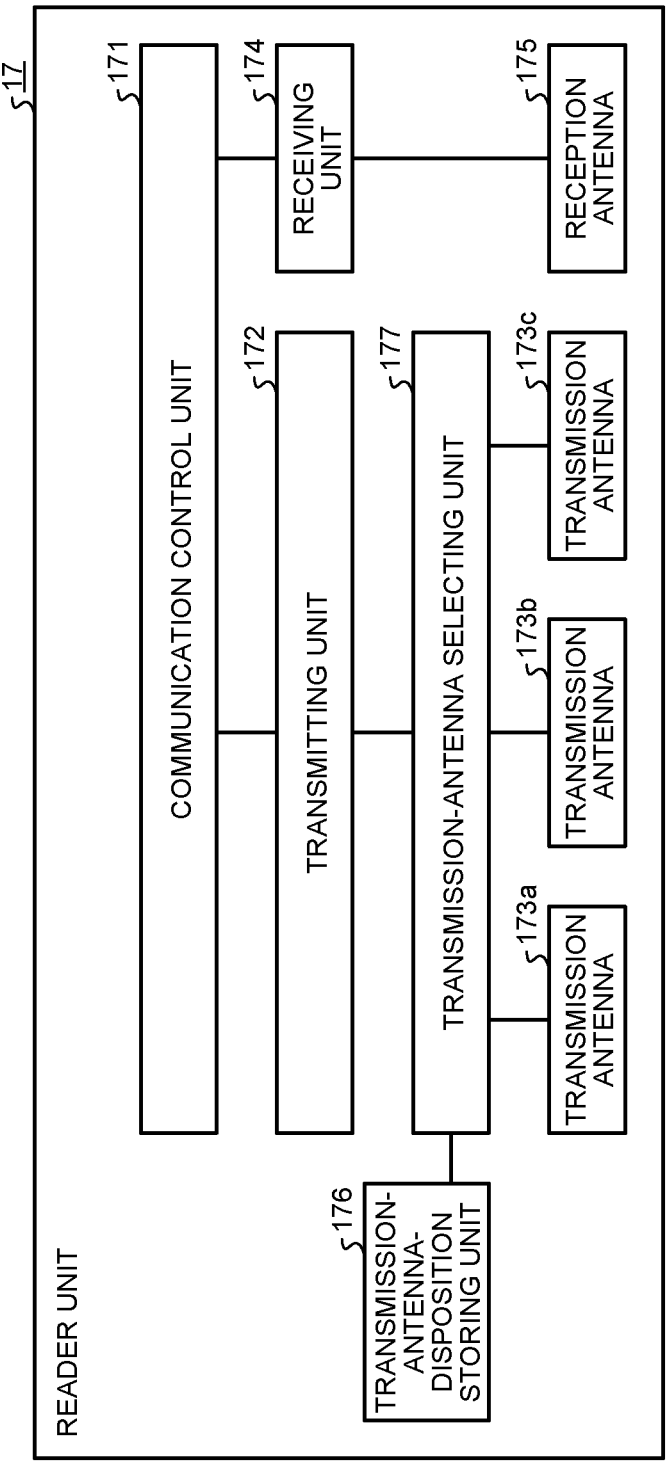
FIG. 9 is a block diagram schematically showing the configuration of a reader unit according to the second embodiment.

FIG. 9 is a block diagram schematically showing the configuration of a reader unit according to the second embodiment. The reader unit 17 further includes, in the reader unit 17 in the first embodiment, a plurality of (in an example shown in the figure, three) transmission antennas 173a to 173c, a transmission-antenna-disposition storing unit 176, and a transmission-antenna selecting unit 177.

The transmission antennas 173a to 173c are provided as many as the motor units 11a to 11c of the access-level control apparatus. As explained in the first embodiment, the transmission antennas 173a to 173c are disposed in parallel to the rotation axes of the motor units 11a to 11c.

The transmission-antenna-disposition storing unit 176 stores transmission antenna disposition information indicating a disposition relation among the transmission antennas 173a to 173c, the motor units 11a to 11c, and the operation detecting unit 15 of the access-level control apparatus.

The transmission-antenna selecting unit 177 is provided between the transmission antennas 173a to 173c and the transmitting unit 172. The transmission-antenna selecting unit 177 selects one transmission antenna from the transmission antennas 173a to 173c and performs transmission. At this point, the transmission-antenna selecting unit 177 selects the transmission antennas 173a to 173c from the transmission antenna disposition information stored in the transmission-antenna-disposition storing unit 176. As a result of transmitting a call signal with the selected transmission antenna, when no response is received from the RFID 20, the transmission-antenna selecting unit 177 selects another transmission antenna. A method of selecting the transmission antennas 173a to 173c, for example, the transmission antennas can be selected in order from the transmission antenna closest to the operation detecting unit 15, which is considered to be a work area or the transmission antenna close to the motor units 11a to 11c having the smallest number of revolutions can be selected first and the transmission antennas disposed close to the motor units selected according to the numbers of revolutions of the motor units 11a to 11c can be selected in order next. Note that the order of the selection is an example. The present invention is not limited to this.

Note that components same as the components in the first embodiment are denoted by the same reference numerals and signs and explanation of the components is omitted.

Figure 10:
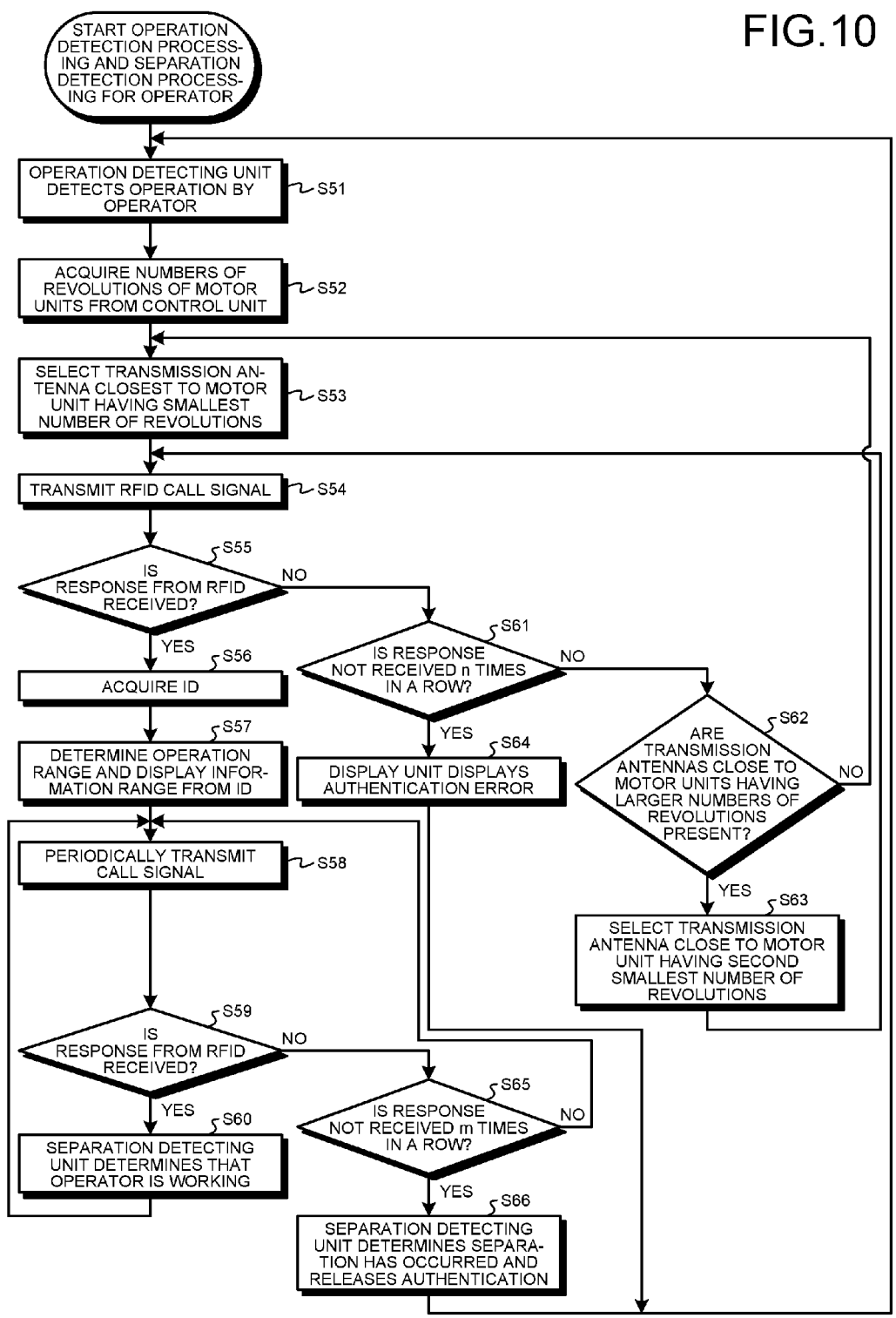
FIG. 10 is a flowchart for explaining an example of a procedure of operation detection processing and separation detection processing for an operator at the time when a transmission antenna is selected from the number of revolutions of a motor unit according to the second embodiment.

FIG. 10 is a flowchart for explaining an example of a procedure of operation detection processing and separation detection processing for an operator at the time when the transmission antenna is selected from the number of revolutions of the motor unit according to the second embodiment. First, the operation detecting unit 15 detects operation by the operator (step S51). The control unit 14 acquires the numbers of revolutions of the motor units 11a to 11c from the motor driving units 12a to 12c (step S52).

Subsequently, the reader unit 17 selects, for example, the transmission antenna closest to the motor unit having the smallest number of revolutions from the transmission antenna disposition information present in the transmission-antenna-disposition storing unit 176 (step S53). Thereafter, the reader unit 17 transmits an RFID call signal (step S54) and determines whether a response from the RFID 20 is received (step S55). When the response from the RFID 20 is received (Yes at step S55), processing same as steps S14 to S18 and S21 to S22 of FIG. 4 in the first embodiment is performed (steps S56 to S60 and S65 to S66).

On the other hand, when the response from the RFID 20 is not received (No at step S55), the reader unit 17 determines whether the response is not received a predetermined number of times (n times: n is a natural number) in a row in all the transmission antennas (step S61). When the response is not received the number of times smaller than the predetermined number of times (No at step S61), the reader unit 17 determines whether the transmission antennas close to the motor units 11 having larger numbers of revolutions are present (step S62). When the transmission antennas close to the motor units 11 having the larger numbers of revolutions are present (Yes at step S62), the reader unit 17 selects the transmission antenna close to the motor unit 11 having the second smallest number of revolutions among the transmission antennas close to the motor units 11 having the larger number of revolution (step S63). Concerning the selected transmission antenna, the reader unit 17 returns to step S54 and performs the processing.

When the transmission antennas close to the motor units 11 having the larger numbers of revolutions are absent at step S62 (No at step S62), that is, when the transmission antenna close to the motor unit 11 having the largest number of revolutions is already selected, the reader unit 17 returns to the processing for selecting the transmission antenna close to the motor unit 11 having the smallest number of revolutions at step S53. Further, when the response is not received the predetermined times in a row at step S61 (Yes at step S61), the control unit 14 displays information indicating an authentication error on the display unit 13 (step S64). The processing returns to step S51.

In the second embodiment, the transmission antennas 173a to 173c are provided anew with respect to the motor units 11a to 11c. The control unit 14 notifies the reader unit 17 of the states of the motor units 11a to 11c. The transmission-antenna selecting unit 177 and the transmissionantenna-disposition storing unit 176 are provided anew to make it possible to select the transmission antenna according to the states of the motor units 11*a* to 11*c*. Consequently, it is possible to preferentially select the transmission antenna having small influence of the motor units 11*a* to 11*c* among the transmission antennas 173*a* to 173*c* and call the RFID 20. As a result, it is possible to obtain an effect that it is possible to stably perform authentication even while the access-level control apparatus is operating and it is possible to reduce time required for the authentication.

Third Embodiment

In the second embodiment, the access-level control apparatus includes the plurality of transmission antennas. In the following example in a third embodiment, an RFID includes a plurality of reception antennas.

Figure 11:
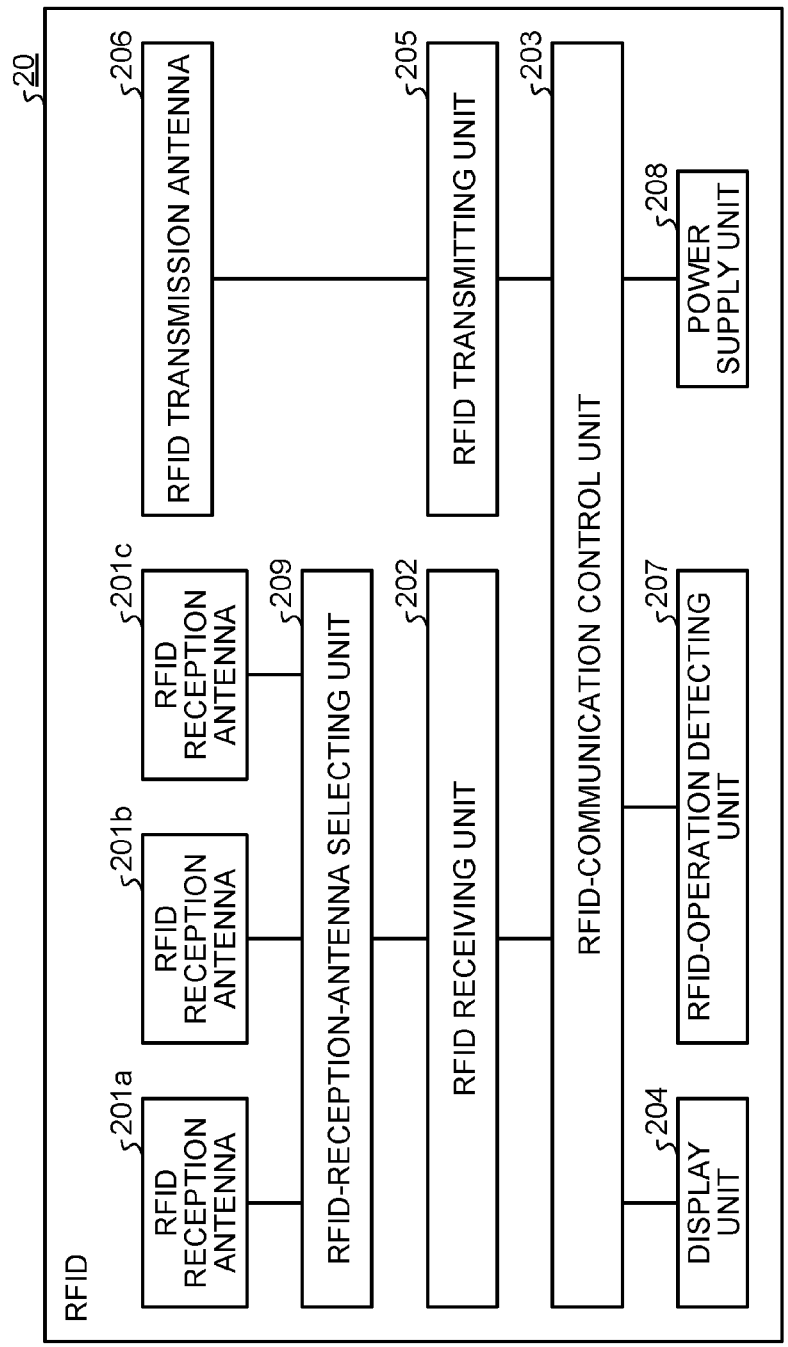
FIG. 11 is a block diagram schematically showing the configuration of an RFID according to a third embodiment.

FIG. 11 is a block diagram schematically showing the configuration of an RFID according to the third embodiment. The RFID 20 further includes, in the RFID 20 in the first embodiment, three RFID reception antennas 201*a* to 201*c* respectively disposed in directions orthogonal to one another and an RFID-reception-antenna selecting unit 209.

The RFID-reception-antenna selecting unit 209 selects the RFID reception antenna according to a predetermined standard. As a method of selecting the RFID reception antenna, for example, it is possible to select the RFID reception antenna having high reception intensity among the RFID reception antennas 201*a* to 201*c* or determining a specific pattern from reception signals of the RFID reception antennas 201*a* to 201*c* and selecting the RFID reception antenna that can detect the specific pattern. Note that these standards for selecting one RFID reception antenna are an example. The RFID reception antenna can be selected according to other standards. Components same as the components in the first embodiment are denoted by the same reference numerals and signs and explanation of the components is omitted.

Figure 12:
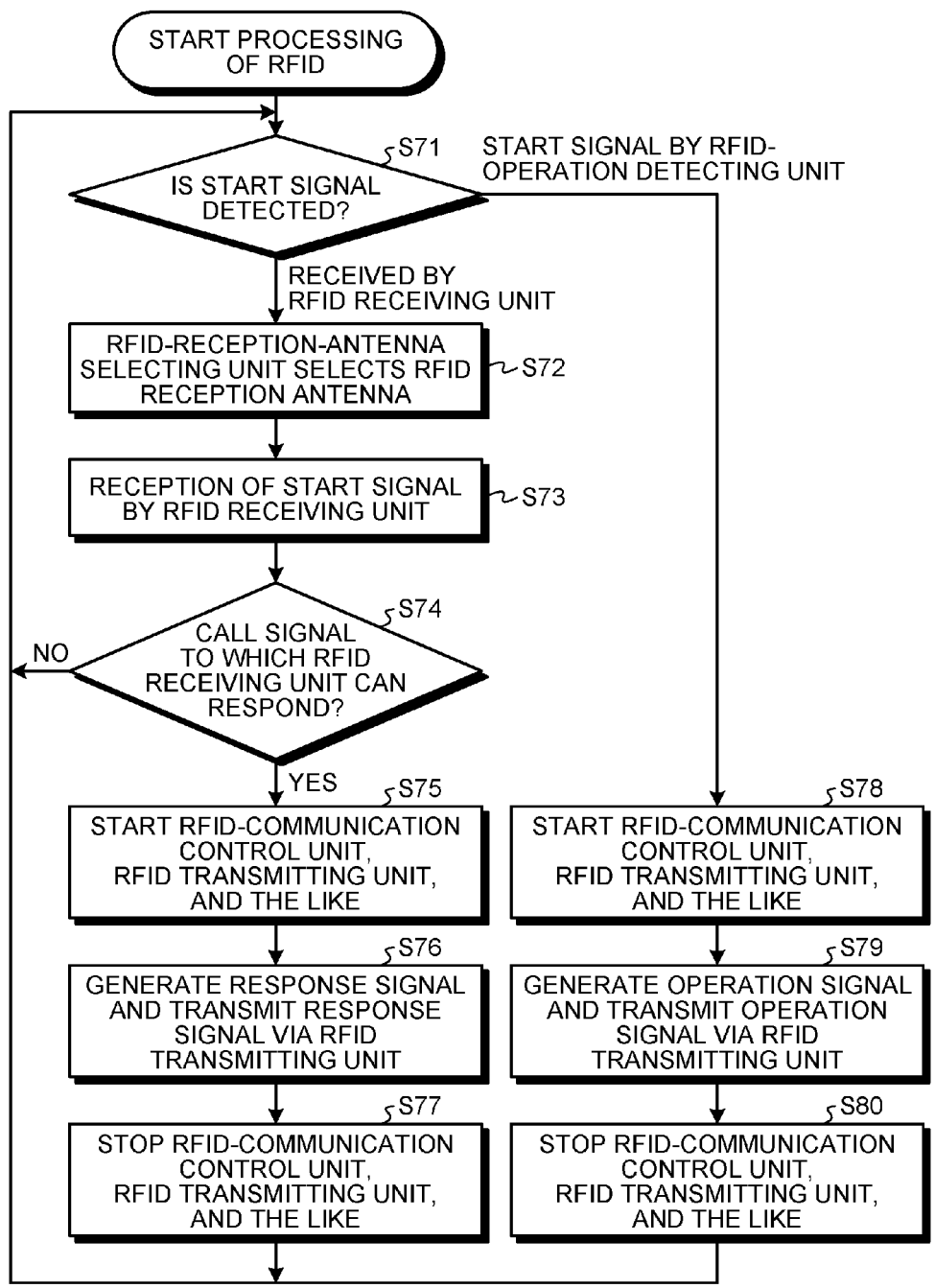
FIG. 12 is a flowchart for explaining an example of processing of the RFID according to the third embodiment.

FIG. 12 is a flowchart for explaining an example of processing of the RFID according to the third embodiment. First, the RFID 20 is in a reception waiting state of a start signal for determining whether the start signal is detected (step S71). At this point, the RFID-communication control unit 203 and the RFID transmitting unit 205 are in a sleep state. Only the RFID receiving unit 202 and the RFID-operation detecting unit 207 are in a started state.

When a call signal transmitted by the reader unit 17 is received by the RFID receiving unit 202 via the RFID reception antenna 201 at step S71 (in the case of reception by the RFID receiving unit at step S71), the RFID-reception-antenna selecting unit 209 selects one RFID reception antenna from the RFID reception antennas 201*a* to 201*c* (step S72). The RFID-reception-antenna selecting unit 209 selects, for example, the RFID reception antenna having the highest reception intensity. The start signal is received by the RFID receiving unit 202 (step S73).

Thereafter, processing is the same as steps S32 to S35 of FIG. 5 in the first embodiment (step S74 to S77). When operation by an operator is detected by the RFID-operation detecting unit 207 at step S71 (in the case of the start signal by the RFID-operation detecting unit at step S71), processing is the same as steps S36 to S38 of FIG. 5 in the first embodiment (steps S78 to S80).

In the third embodiment, the three RFID reception antennas 201*a* to 201*c* in directions orthogonal to one another are provided as the RFID reception antennas. The RFID-reception-antenna selecting unit 209 that selects one RFID reception antenna out of the RFID reception antennas 201*a* to 201*c* on the basis of reception intensity or a specific pattern determination result is provided. Consequently, there is an effect that stable authentication is possible.

When the RFID reception antenna having high reception intensity is selected among the three RFID reception antennas 201*a* to 201*c*, it is possible to select the reception antenna in a direction in which a call signal from the reader unit 17 is intense and it is possible to stably perform authentication.

Fourth Embodiment

In the first to third embodiments, the control of the motor unit is performed even during the authentication. However, in a fourth embodiment, an access-level control apparatus is explained that can stop the control of the motor unit to make it possible to reduce noise during the authentication.

Figure 13:
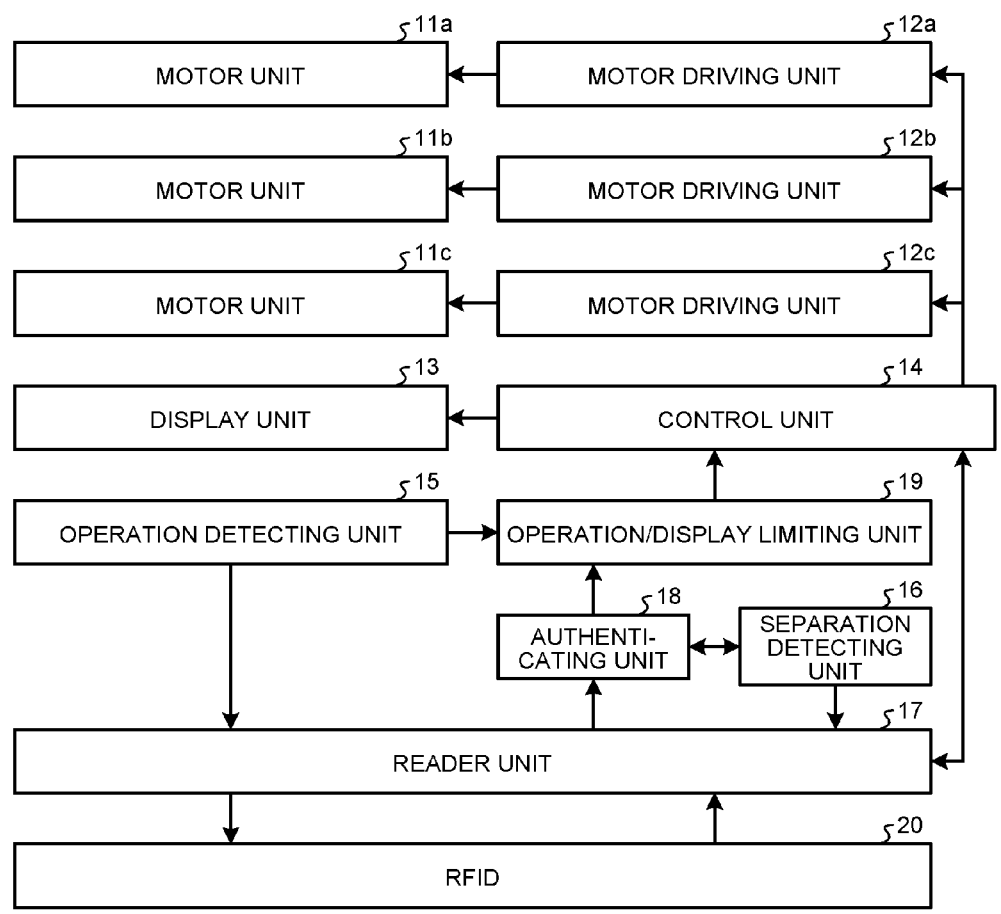
FIG. 13 is a block diagram schematically showing the configuration of an access-level control apparatus according to a fourth embodiment.

FIG. 13 is a block diagram schematically showing the configuration of an access-level control apparatus according to the fourth embodiment. The access-level control apparatus is configured such that, in the access-level control apparatus in the second embodiment, the reader unit 17 further includes a function of notifying control stop information of the motor units 11*a* to 11*c* from the reader unit 17 to the control unit 14 to make it possible to reduce noise during the authentication. Note that components same as the components in the first and second embodiments are denoted by the same reference numerals and signs and explanation of the components is omitted.

Figure 14:
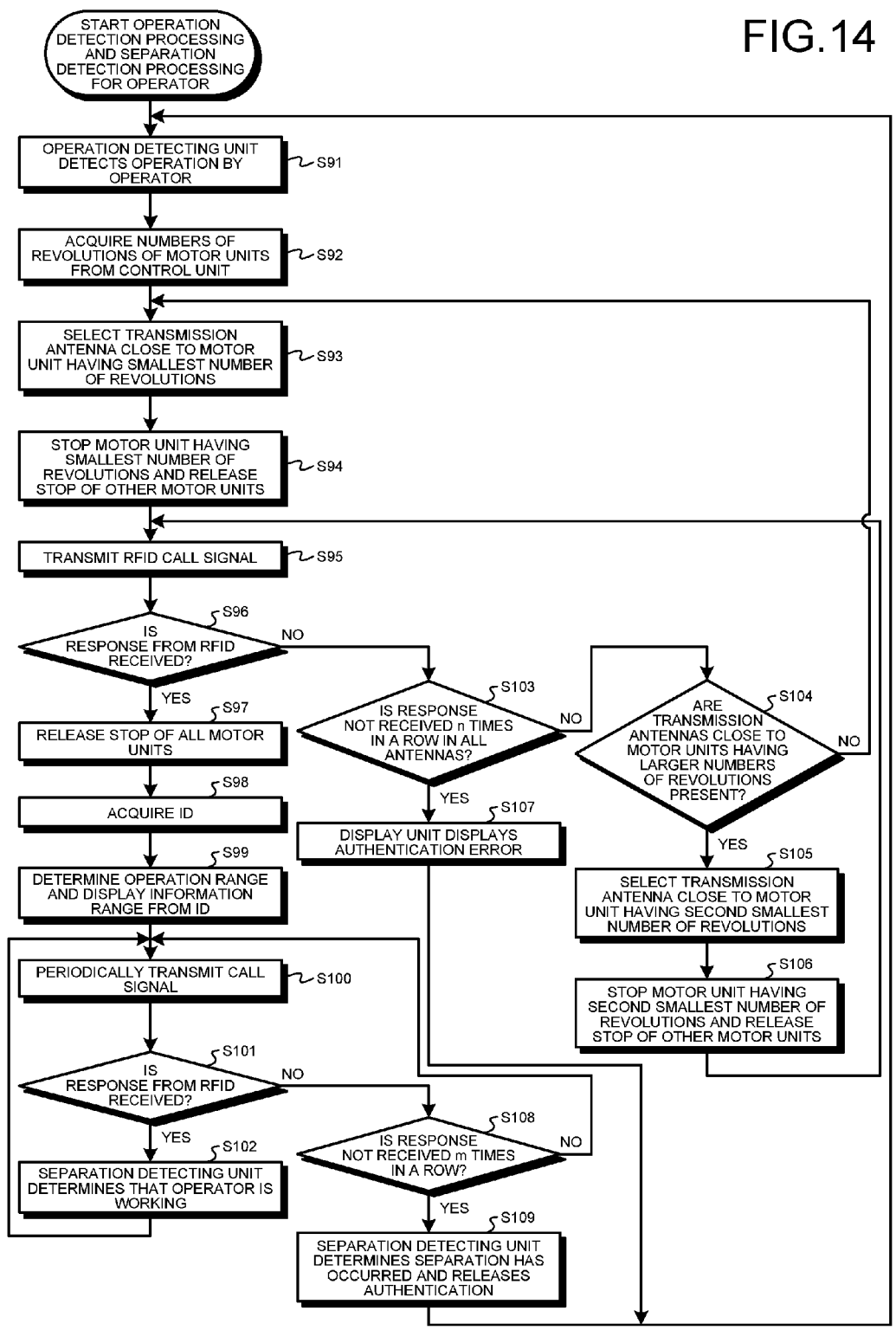
FIG. 14 is a flowchart for explaining an example of a procedure of operation detection processing and separation detection processing for an operator at the time when a transmission antenna is selected from the number of revolutions of a motor unit according to the fourth embodiment.

FIG. 14 is a flowchart for explaining an example of a procedure of operation detection processing and separation detection processing of an operator at the time when a transmission antenna is selected from the number of revolutions of a motor unit according to the fourth embodiment. First, the reader unit 17 detects operation by the operator with the operation detecting unit 15 (step S91) and acquires the numbers of revolutions of the motor units 11*a* to 11*c* from the control unit 14 (step S92). Subsequently, the reader unit 17 selects, for example, a transmission antenna close to the motor unit having the smallest number of revolutions from the transmission antenna disposition information present in the transmission-antenna-disposition storing unit 176 (step S93).

Thereafter, the reader unit 17 instructs the control unit 14 to stop the motor unit close to the transmission antenna selected at step S93, that is, the motor unit having the smallest number of revolutions and, when the other motor units are stopped, release the stop (step S94).

Subsequently, the reader unit 17 transmits an RFID call signal (step S95) and determines whether a response from the RFID 20 is received (step S96). When the response from the RFID 20 is received (Yes at step S96), the reader unit 17 releases the stop of all the motor units 11*a* to 11*c* (step S97). Thereafter, processing same as steps S56 to S60 and S65 to S66 of FIG. 10 in the second embodiment is performed (steps S98 to S102 and S108 to S109).

When the response from the RFID 20 is not received (No at step S96), the reader unit 17 determines whether the response is not received a predetermined number of times (n times: n is a natural number) in a row in all the transmission antennas (step S103). When the response is not received the number of times smaller than the predetermined number of times (No at step S103), the reader unit 17 determines whether the transmission antennas close to the motor units having larger numbers of revolutions are present (step S104). When the transmission antennas close to the motor units having the larger numbers of revolutions are present (Yes at step S104), the reader unit 17 selects the transmission antenna close to the motor unit having the second smallest number of revolutions among the transmission antennas close to the motor units having the larger numbers of revolutions (step S105).

Thereafter, the reader unit 17 stops the motor unit close to the transmission antenna selected at step S105, that is, the motor unit having the second smallest number of revolutions and instructs, when the other motors are stopped, the control unit 14 to release the stop (step S106). Concerning the selected transmission antenna, the reader unit 17 returns to step S95 and performs the processing.

When the transmission antennas close to the motor units having the larger numbers of revolutions are absent at step S104 (No at step S104), that is, when the transmission antenna close to the motor unit having the largest number of revolutions is already selected, the reader unit 17 returns to the processing for selecting the transmission antenna close to the motor unit having the smallest number of revolutions at step S93. Further, when the response is not received the predetermined number of times in a row at step S103 (Yes at step S103), the control unit 14 displays information indicating an authentication error on the display unit 13 (step S107) and returns to step S91.

In the fourth embodiment, the function of instructing the control unit 14 to stop the motor units and release the stop is provided in the reader unit 17. Consequently, the motor units, which become noise sources during the authentication with the RFID 20, are stopped. Therefore, there is an effect that it is possible to prevent an authentication failure due to noise from the motor units and it is possible to stably perform the authentication.

Note that, when the reader unit 17 transmits the call signal to the RFID 20, the reader unit 17 can transmit, to the control unit 14, on the basis of transmission antenna disposition information indicating a disposition relation between the transmission antennas 173a to 173c and the motor units 11a to 11c, an instruction for stopping only the motor unit disposed closest to the selected transmission antenna. Consequently, it is possible to prevent an authentication failure due to noise from the motor units and stably perform the authentication while securing workability by stopping only the motors affected by noise while keeping the motor units not affected by the noise operating.

INDUSTRIAL APPLICABILITY

As explained above, the access-level control apparatus according to the present invention is useful when the operator of the NC machining apparatus is authenticated by the RFID.

REFERENCE SIGNS LIST 11, 11a to 11c motor unit
12, 12a to 12c motor driving unit
13 display unit
14 control unit
15 operation detecting unit
16 separation detecting unit
17 reader unit
18 authenticating unit
19 operation/display limiting unit
111 rotation axis
171 communication control unit
172 transmitting unit
173, 173a to 173c transmission antenna
174 receiving unit
175 reception antenna
176 transmission-antenna-disposition storing unit
177 transmission-antenna selecting unit
201, 201a to 201c RFID reception antenna
202 RFID receiving unit
203 RFID-communication control unit
204 display unit
205 RFID transmitting unit
206 RFID transmission antenna
207 RFID-operation detecting unit
208 power supply unit
209 RFID-reception-antenna selecting unit

The invention claimed is:

1. An access-level control apparatus comprising:
an NC machine tool;
an RFID held by an operator, the RFID storing an ID given to the operator;
a reader unit that reads out the ID in the RFID;
an authenticating unit that determines operator processing limitation information including an operable range by the operator associated with the ID or display information provided to the operator;
an operation/display limiting unit that limits processing by the operator for the NC machine tool on the basis of the operator processing limitation information; and
an operation detecting unit that detects operation of the NC machine tool by the operator, wherein
the reader unit includes a transmission antenna that calls the RFID, and
the transmission antenna is disposed in parallel to a rotation axis of a motor unit of the NC machine tool disposed in a position closest to the operation detecting unit.

2. The access-level control apparatus according to claim 1, wherein the transmission antenna uses a near magnetic field as a signal for calling the RFID.

3. The access-level control apparatus according to claim 2, wherein
the RFID includes:
an RFID reception antenna that receives a signal from the reader unit;
an RFID receiving unit that demodulates the signal received by the RFID reception antenna;
an RFID-communication control unit that generates a response signal to the demodulated signal;
an RFID transmitting unit that modulates the response signal; and
an RFID transmission antenna that transmits the modulated response signal, and
the RFID receiving unit is supplied with electric power by induction from the near magnetic field and, after determining that the received signal is a normal call signal, starts the RFID-communication control unit and the RFID transmitting unit that are in a sleep state.

4. The access-level control apparatus according to claim 3, wherein the RFID further includes:
a trio of the RFID reception antennas orthogonal to one another; and
an RFID-reception-antenna selecting unit that selects a singularity of the RFID reception antenna from the three RFID reception antennas.

5. The access-level control apparatus according to claim 4, wherein the RFID-reception-antenna selecting unit selects the RFID reception antenna having high reception intensity among the three RFID reception antennas.

6. The access-level control apparatus according to claim 4, wherein the RFID-reception-antenna selecting unit selects the RFID reception antenna capable of receiving a specific pattern transmitted by the reader unit among the three RFID reception antennas.

7. The access-level control apparatus according to claim 1, wherein
the NC machine tool includes a plurality of the motor units and a plurality of motor driving units,
the reader unit includes:
a plurality of the transmission antennas; and
a transmission-antenna selecting unit that selects a singularity of the transmission antenna among the transmission antennas,
the transmission antennas are disposed in parallel to the rotation axes of the motor units disposed closest to the transmission antennas, and
the transmission-antenna selecting unit selects the one transmission antenna on the basis of control information received from the NC machine tool and transmission antenna disposition information indicating a disposition relation between the transmission antennas and the motor units.

8. The access-level control apparatus according to claim 7, wherein
the control information is numbers of revolutions of the motor units received from the motor driving units, and
the transmission-antenna selecting unit selects the transmission antenna disposed near the motor unit having a small number of revolutions.

9. The access-level control apparatus according to claim 1, wherein, when transmitting a call signal to the RFID, the reader unit transmits an instruction for stopping the motor unit to the NC machine tool.

10. The access-level control apparatus according to claim 1, where, when transmitting a call signal to the RFID, the reader unit transmits, to the NC machine tool, an instruction for stopping only the motor unit disposed closest to the transmission antenna selected on the basis of transmission antenna disposition information indicating a disposition relation between a plurality of the transmission antennas and a plurality of the motor units.

11. An access-level control apparatus comprising:
an NC machine tool;
an RFID held by an operator, the RFID storing an ID given to the operator;
a reader unit that reads out the ID in the RFID;
an authenticating unit that determines operator processing limitation information including an operable range by the operator associated with the ID or display information provided to the operator;
an operation/display limiting unit that limits processing by the operator for the NC machine tool on the basis of the operator processing limitation information; and
an operation detecting unit that detects operation of the NC machine tool by the operator, wherein
the reader unit includes a transmission antenna that calls the RFID, and
the transmission antenna is disposed in parallel with the rotation axis of the motor unit having a largest capacity of the NC machine tool.

12. The access-level control apparatus according to claim 11, wherein the transmission antenna uses a near magnetic field as a signal for calling the RFID.

13. The access-level control apparatus according to claim 12, wherein
the RFID includes:
an RFID reception antenna that receives a signal from the reader unit;
an RFID receiving unit that demodulates the signal received by the RFID reception antenna;
an RFID-communication control unit that generates a response signal to the demodulated signal;
an RFID transmitting unit that modulates the response signal; and
an RFID transmission antenna that transmits the modulated response signal, and
the RFID receiving unit is supplied with electric power by induction from the near magnetic field and, after determining that the received signal is a normal call signal, starts the RFID-communication control unit and the RFID transmitting unit that are in a sleep state.

14. The access-level control apparatus according to claim 13, wherein the RFID further includes:
a trio of the RFID reception antennas orthogonal to one another; and
an RFID-reception-antenna selecting unit that selects a singularity of the RFID reception antenna from the three RFID reception antennas.

15. The access-level control apparatus according to claim 14, wherein the RFID-reception-antenna selecting unit selects the RFID reception antenna having high reception intensity among the three RFID reception antennas.

16. The access-level control apparatus according to claim 14, wherein the RFID-reception-antenna selecting unit selects the RFID reception antenna capable of receiving a specific pattern transmitted by the reader unit among the three RFID reception antennas.

17. The access-level control apparatus according to claim 11, wherein, when transmitting a call signal to the RFID, the reader unit transmits an instruction for stopping the motor unit to the NC machine tool.

18. The access-level control apparatus according to claim 11, where, when transmitting a call signal to the RFID, the reader unit transmits, to the NC machine tool, an instruction for stopping only the motor unit disposed closest to the transmission antenna selected on the basis of transmission antenna disposition information indicating a disposition relation between a plurality of the transmission antennas and a plurality of the motor units.

* * * * *